(12) United States Patent
Sturdevant et al.

(10) Patent No.: US 9,623,925 B2
(45) Date of Patent: Apr. 18, 2017

(54) VEHICLE SUPPORT STAND

(71) Applicants: Michael Sturdevant, Concord Township, OH (US); Jeffrey L. Deeney, Ft. Collins, CO (US)

(72) Inventors: Michael Sturdevant, Concord Township, OH (US); Jeffrey L. Deeney, Ft. Collins, CO (US)

(*) Notice: Subject to any disclaimer, the term of this patent is extended or adjusted under 35 U.S.C. 154(b) by 269 days.

(21) Appl. No.: 14/609,126

(22) Filed: Jan. 29, 2015

(65) Prior Publication Data

US 2015/0217822 A1    Aug. 6, 2015

Related U.S. Application Data

(60) Provisional application No. 61/935,409, filed on Feb. 4, 2014.

(51) Int. Cl.
| | | |
|---|---|---|
| *B62D 1/02* | (2006.01) | |
| *B62D 1/06* | (2006.01) | |
| *B62H 1/06* | (2006.01) | |
| *B62H 1/02* | (2006.01) | |

(52) U.S. Cl.
CPC ............... *B62H 1/06* (2013.01); *B62H 1/02* (2013.01)

(58) Field of Classification Search
CPC ... B62H 1/00; B62H 1/02; B62H 1/06; B62H 2700/00
USPC .................................................. 280/297–301
See application file for complete search history.

(56) References Cited

U.S. PATENT DOCUMENTS

| 480,441 | A | * | 8/1892 | Siar et al. | B62H 7/00 248/354.7 |
|---|---|---|---|---|---|
| 525,954 | A | * | 9/1894 | Kinder | B62K 3/002 280/296 |
| 702,862 | A | * | 6/1902 | Moss | B62H 7/00 280/294 |
| 717,271 | A | * | 12/1902 | Rasmusson | B62K 3/002 280/296 |
| 1,180,921 | A | * | 4/1916 | Hosaka | B62H 1/00 280/297 |
| 1,280,069 | A | * | 9/1918 | Morgan | B62H 1/00 280/299 |
| 1,451,210 | A | * | 4/1923 | Eslick | B62H 1/00 280/304 |
| 2,633,934 | A | * | 4/1953 | Champoux | B62H 1/06 188/140 R |
| 4,432,562 | A | * | 2/1984 | Cline | B62H 1/06 180/219 |

(Continued)

*Primary Examiner* — Anne Marie Boehler
(74) *Attorney, Agent, or Firm* — Roger D. Emerson; Emerson, Thomson & Bennett, LLC

(57) ABSTRACT

An extendable and retractable support stand for holding a parked vehicle such as a motorcycle, bicycle or similar vehicle which is otherwise unstable in an upright position. The support stand has the ability to be locked into place without the need for fixed locking positions by means of a tilted plate locking mechanism that can be operated by the operator using only one foot irrespective of the orientation of the support stand. The support members may include an outer telescoping member pivotally attach to the vehicle frame, an inner support member, a support pad, a running clutch mechanism that automatically locks the telescoping members, and a refraction spring to automatically return the stand to the minimum length when the clutch mechanism is disengaged.

18 Claims, 9 Drawing Sheets

(56) References Cited

U.S. PATENT DOCUMENTS

| | | | | |
|---|---|---|---|---|
| 4,986,557 A | * | 1/1991 | Muszynski | B62H 1/06 280/298 |
| 6,494,423 B1 | * | 12/2002 | Ruth | A47B 91/02 248/188.8 |
| 7,097,191 B2 | * | 8/2006 | Griggs | B62H 1/06 248/188.9 |
| 8,424,895 B1 | * | 4/2013 | Stokes | B62H 1/02 280/293 |

* cited by examiner

VEHICLE SUPPORT STAND

I. BACKGROUND

A. Technical Field

Provided is a side stand for a motorcycle or like vehicle of a kind which will not stand unattended on its own.

B. Description of Related Art

The present disclosure relates to a side stand for a motorcycle or like vehicle of a kind which will not stand unattended on its own. Side stands for motorcycles have long been employed as a means for maintaining the vehicle substantially upright when left unattended. To this end, devices have been developed which, through springs or other mechanisms, provide a plurality of established positions. Pivoted side stand legs typically are biased to the fully retracted position where they extend substantially rearwardly on the vehicle adjacent the frame when traveling. A load bearing position is also provided where the leg extends downwardly and forwardly on the vehicle.

Off highway motorcycles present additional challenges. Because of the highly variable terrain on which the motorcycle must be parked, a traditional side stand of fixed length will not always result in a stable parking position. A side stand with easily adjustable length enables stable parking on uneven terrain as well as allowing accommodation of the motorcycle height due to changes in suspension settings or varying cargo load on the motorcycle. To easily accommodate the conditions above, the adjustable motorcycle side stand should have a length that can be quickly changed without the need for tools while the operator simultaneously balances the vehicle. Because of the harsh environment experienced on off highway vehicles, the adjustable side stand should be resistant to fouling from water, dirt and ice.

II. SUMMARY

Provided is a support stand for holding a parked vehicle in an upright position. The support member includes an outer telescoping member having a hollow interior attached to a vehicle frame via a pivot point and a fastener which allows for angular movement of the support stand with respect to the vehicle along the pivot point, wherein the outer telescoping member includes a top portion and a bottom portion; an inner support member having a hollow interior which extensibly fits in a telescoping manner within the interior of the outer telescoping member, wherein the inner support member includes a top portion and a bottom portion; a ratcheting mechanism positioned within a clutch body housing for locking the inner support member with respect to the outer telescoping member, wherein the ratcheting mechanism is lockable in any position along a length of travel between the outer telescoping member and the inner support member with the support stand positioned in any angular position with respect to the vehicle and wherein the clutch body housing engages the outer telescoping member and the inner support member; and an extension spring that is fit within the hollow interior of the outer telescoping member and the hollow interior of the inner support member, wherein the extension spring includes an upper end which is attached at a point at the top portion of the outer telescoping member and a lower end attached at a point at the bottom portion of the lower telescoping assembly and wherein the extension spring allows the inner support member to extend and retract relative to the outer telescoping member.

According to certain aspects of the present disclosure, the outer telescoping member is positioned at a top portion of the support stand, the inner support member is positioned at a bottom portion of the support stand and the inner support member is longitudinally extendable and retractable relative to the outer telescoping member when the support stand is in a downward position.

According to further aspects of the present disclosure, a support foot is attached to a bottom surface of the inner support member.

According to further aspects of the present disclosure, the clutch body housing includes a longitudinal aperture, a side wall, a first lateral surface positioned within the interior of the clutch body housing between the sidewall to engage or seat the outer telescoping member while allowing longitudinal movement of the inner support tube relative to the outer telescoping tube.

According to further aspects of the present disclosure, the clutch body housing includes at least one tilted locking plate and a locking plate engagement spring both of which are seated at a second bottom surface under the first lateral surface of the clutch body housing and wherein the locking plate engagement spring is positioned under the tilted locking plate.

According to further aspects of the present disclosure, the clutch body housing further includes a second lateral aperture which houses the tilted locking plate.

According to further aspects of the present disclosure, the tilted locking plate includes an aperture through which the inner support member longitudinally passes through when the support stand is in a downward position relative to the vehicle.

According to further aspects of the present disclosure, the tilted locking plate has an extension arm which is externally accessible to an operator from the clutch body housing and the extension on the locking plate, when moved into a first position along an axis transverse to the outer telescoping member and the inner support member, unlocks the ratcheting mechanism and when moved into a second position along an axis transverse to the outer telescoping member and the inner support member, locks the ratcheting mechanism.

According to further aspects of the present disclosure, the inner support member is longitudinally extended in any orientation of varying length with respect to the outer support member by pulling the inner support member outward with respect to the outer telescoping member and the inner support member is longitudinally retracted in any orientation of varying length with respect to the outer support member by axially moving the extension arm of the tilted locking plate in the first position to retract the support stand.

According to further aspects of the present disclosure, the extension spring biases the inner support member to a position of full retraction.

According to further aspects of the present disclosure, the support foot is pressed downward to extend the inner support member a desired length outward when the locking plate is in the first position.

According to further aspects of the present disclosure, the ratcheting mechanism does not rely on finite and fixed adjustment points to lock the outer telescoping member and the inner support member in various positions with respect to each other.

According to further aspects of the present disclosure, the tilted locking plate grips the inner support member without the need for stopping points present on either of the outer telescoping member or the inner support member to engage the tilted locking plate. Stopping points may include slots, segments or like structures present on the inner support member.

According to further aspects of the present disclosure, a load applied to the support stand causes a corresponding force to be applied to the tilted plate which in turn causes the tilted plate to bind with greater force against the inner support member.

According to further aspects of the present disclosure, the tilted locking plate is manufactured from one of the following materials: tempered steel and stainless steel.

According to further aspects of the present disclosure, the inner support member contains bushings at its top portion to limit the travel of the inner support member relative to the outer telescoping member, to prevent rotation of the inner support member relative to the outer telescoping member and to provide sliding support against the outer telescoping member's inner surface.

According to further aspects of the present disclosure, the bushings engage the inner support member through a boss which engages apertures present at the top portion of the inner support member.

According to further aspects of the present disclosure, the bushings have an outer surface which engages the interior of the outer telescoping member while providing sufficient clearance to allow for slidable engagement with the inner support member.

According to further aspects of the present disclosure, the outer telescoping member engages a pivot head which is pivotally engaged to the frame on the vehicle.

According to further aspects of the present disclosure, a spring is mounted in an over-center position between the support stand and the vehicle frame to allow for axial rotation of the support stand relative to the vehicle frame.

III. BRIEF DESCRIPTION OF THE DRAWINGS

IV. DETAILED DESCRIPTION

Provided is a support stand for a vehicle. Features of the support stand may include but are not limited to: an outer support stand with a longitudinal bore to receive an inner telescoping support mechanism and an inner telescoping support stand which can be locked into place through the use of a tilted friction plate which may include a locking mechanism to lock the stand at a desired length. Extension of the inner support mechanism may be resisted by an extension spring. One end of the support stand may contain a means for pivotally attaching to the frame of the vehicle being supported. The opposite end of the support stand may have an enlarged pad that is used to support the vehicle on soft surfaces as well as to provide a surface on which to easily apply force to extend the device.

Figure 10:
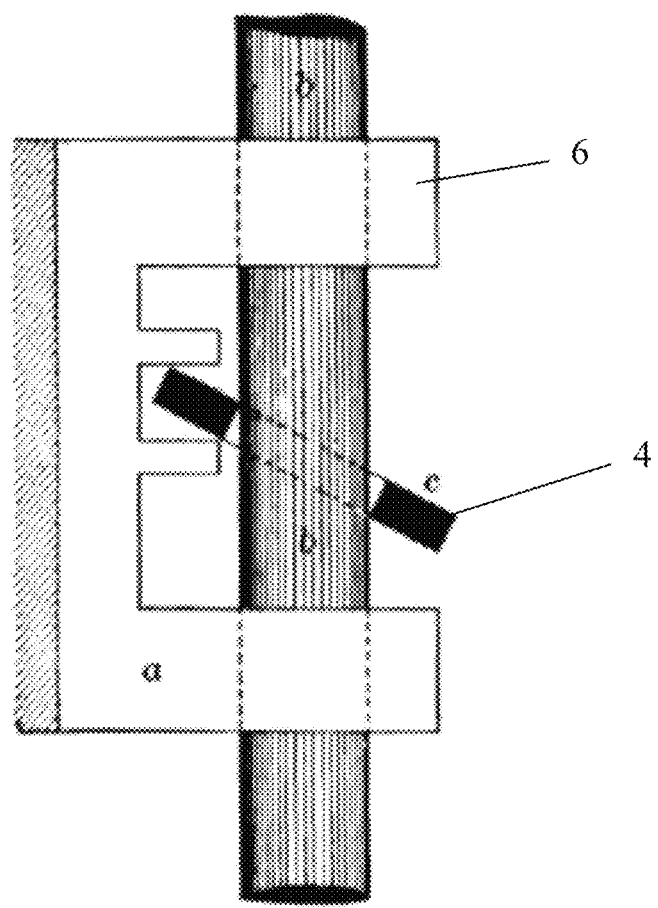
FIG. 10 illustrates a typical running friction ratchet that may be utilized within the outer housing clutch mechanism or clutch body.

In accordance with the design of a tilted plate locking mechanism, the inner support tube or member can be extended without any need to operate the release mechanism. Simply pulling the inner support member with respect to the outer support member will cause the stand to be extended and secured by the locking plate slipping in the appropriate position within the friction ratchet in the outer housing clutch mechanism. An example of a running friction ratchet that may be utilized within an outer housing clutch mechanism or clutch body is illustrated within FIG. 10. In addition, through the use of an integral spring, the tilted plate can be kept at an orientation that will allow for easy extension, but will automatically lock the device against the application of compressive forces on the support mechanism. Because of the nature of the locking device, it is not limited to the coarse resolution of fixed locking positions. The nature of the locking device also assures that resistance of the telescoping members will increase as the load on the support mechanism increases.

The support stand is fully retractable in any orientation by pressing on one end of the tilted locking plate to urge the plate toward a position perpendicular to telescoping tubes, thus allowing the inner support member to easily pass through the central bore of the locking plate. By utilizing an internal extension spring, the support member may be automatically pulled to shortest possible length when the tilted locking plate is depressed by the operator. To extend the support mechanism to the desired length, the operator may simply use his foot to press on the top of the support pad until the support stand is extended to the desired length as movement of the locking plate to extend the stand is not required. Extension and retraction operations can be performed with the support structure in any orientation.

In accordance with other design features of the present disclosure, mechanisms which limit the movement of the telescoping members in both length and rotation with respect to the telescoping members may also be present. Limitation of rotational movement can be obtained with a pin and slot arrangement, using tubular telescoping features with mating flat surfaces to prevent rotation, or using guides attached to one of the telescoping mechanisms that engages features on the other telescoping mechanism. A round inner support tube with at least one feature near the upper end may be used to solidly capture one or more support bushings that engage the rectangular inner surfaces of the outer support tube to prevent rotational movement while also limiting the maximum extension of the support mechanism by contacting the tilted plate assembly. The minimum length may be limited by the inner support tube firmly contacting the upper support used to attach the pivotal member to the vehicle frame.

Figure 1:
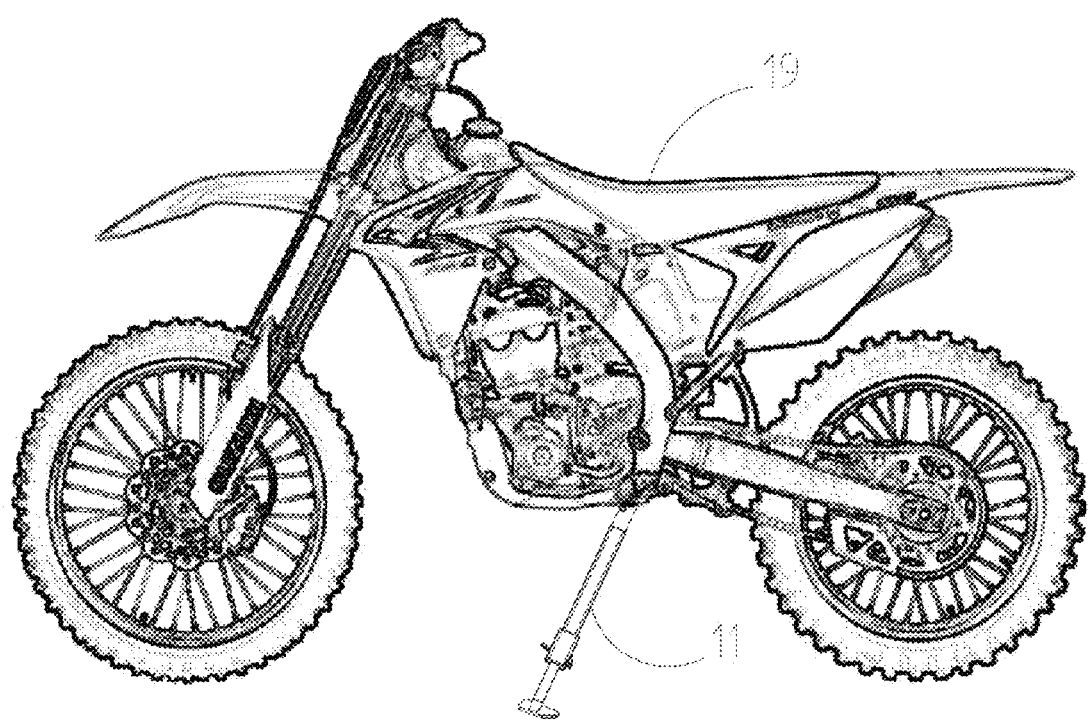
FIG. 1 is a diagram illustrating an adjustable kickstand on a typical off-highway motorcycle.
Figure 2:
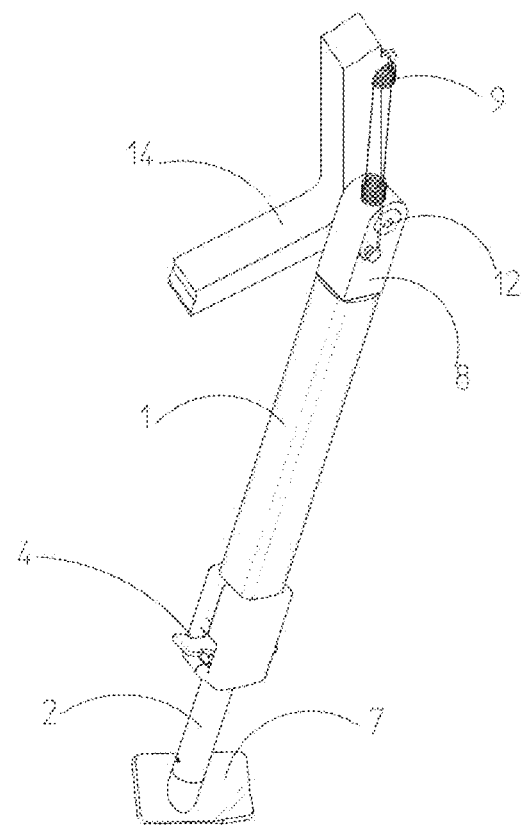
FIG. 2 is an isometric view illustrating the attachment of a telescoping support mechanism to a motorcycle frame.
Figure 3:
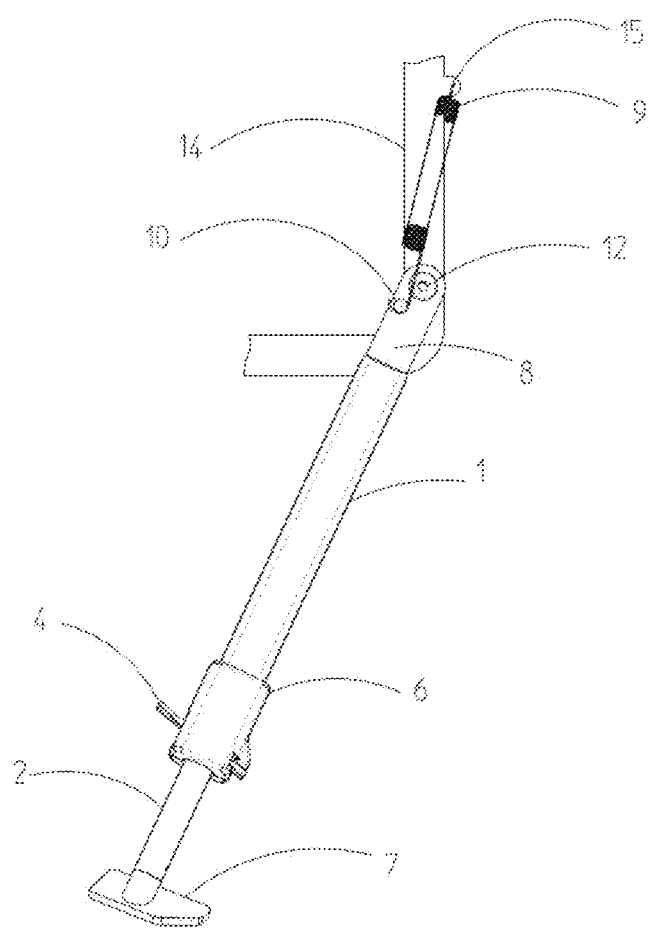
FIG. 3 is a side view of the support stand shown in the deployed position. The spring 9 is used to hold the support stand in either the deployed or stowage position.
Figure 4:
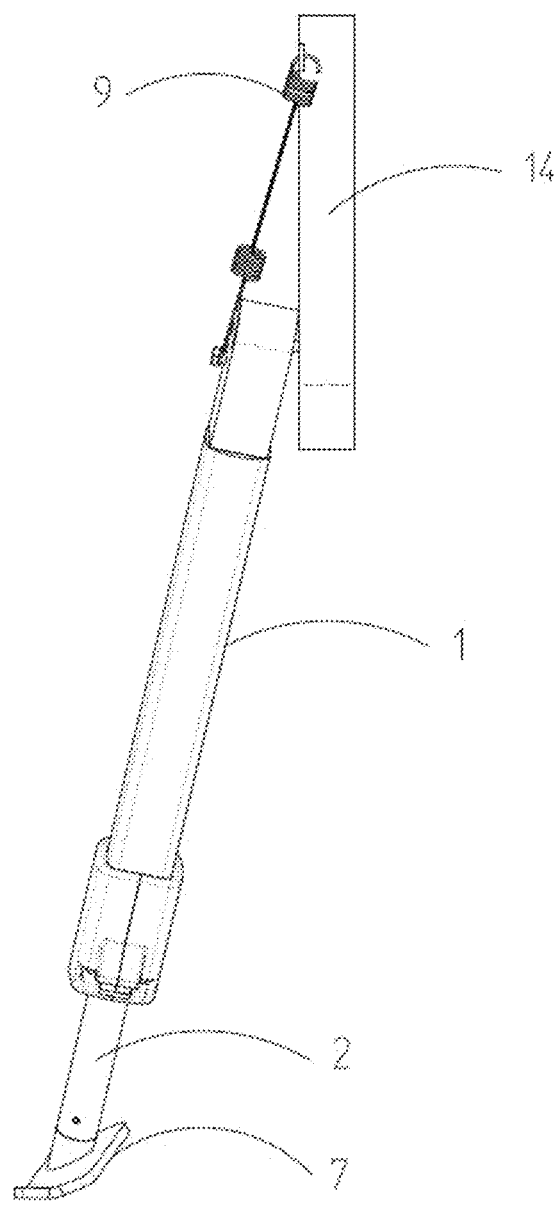
FIG. 4 is a typical view of the support structure from the rear of the vehicle showing the compound angle typically used to support a vehicle.

While the present disclosure encompasses numerous embodiments of differing variations and forms, FIGS. 1 through 9 illustrate its application on a typical motorcycle, such as an off-highway motorcycle. FIG. 1 illustrates the mounting of a typical motorcycle side stand, hereinafter referred to as a support stand. When deployed, the support stand 11 is typically angled outward from the frame and forward to support the motorcycle 19. FIGS. 2 and 3 illustrate the mounting of the support stand to a typical motorcycle frame 14. As is common practice, a spring 9 is mounted in an over-center position between the support stand 11 and the motorcycle frame 14. This arrangement keeps the support stand 11 in the downward position until the operator stands the motorcycle upright and pushes rearward on the support stand 11. Once the stand is rotated beyond a center position the spring 9 will continue to move the support stand to the stowage position; typically facing rearward on the motorcycle.

In summary, FIG. 2 illustrates the upper head 8 is pivotally attached to the vehicle frame with a pivot bolt 12. Releasing the tilted plate locking mechanism retracts the support mechanism to the minimum length by pressing on the release tab 4. The support mechanism is extended to the desired length by pressing downward on the support foot 7.

In summary, FIG. 2 illustrates the upper head 8 is pivotally attached to the vehicle frame with a pivot bolt 12. Releasing the tilted plate locking mechanism retracts the support mechanism to the minimum length by pressing on the release tab 4. The support mechanism is extended to the desired length by pressing downward on the support foot 7.

Figure 5:
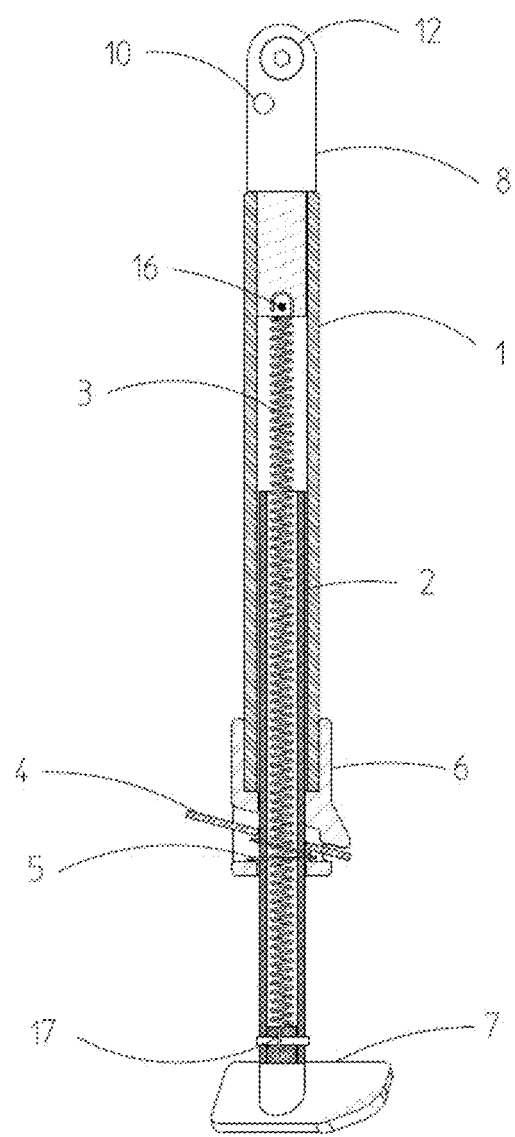
FIG. 5 is a cross sectional view of the internal components of an exemplary support stand having a telescoping support mechanism.
Figure 6:
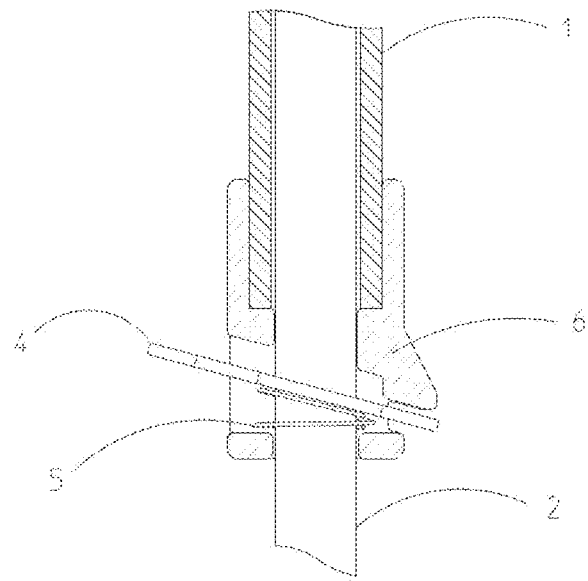
FIG. 6 is a cross sectional view of the locking mechanism on an exemplary support stand.
Figure 7:
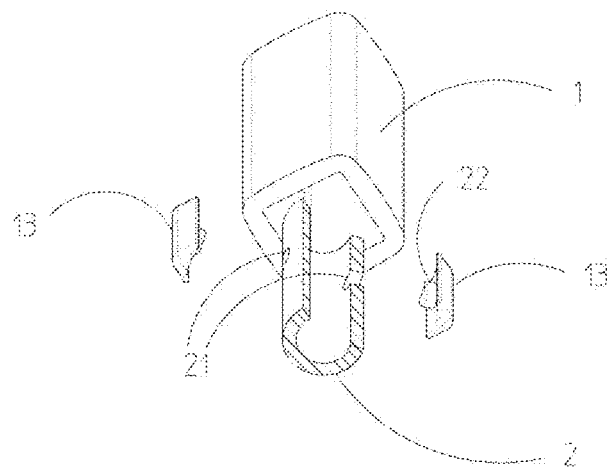
FIG. 7 is an exploded perspective view of the bushings utilized in an exemplary support stand.

FIGS. 5-7 illustrate the internal construction of an exemplary support stand. All references to orientation of the construction of this embodiment will hereafter be made with reference to the deployed position of the support stand with the support pad 7 placed downward against the ground and the pivot head 8 oriented upward toward the vehicle. The top or pivot head 8 of the stand contains a round hole by which the stand can be pivotally attached to the frame 14 of the motorcycle using a pivot bolt 12.

The pivot head 8 is firmly attached to an outer telescoping tube 1 (also referred to in a more general sense as an outer telescoping member which encompasses a support structure of any suitable shape). In certain embodiments, the outer telescoping tube 1 is positioned on the top or upper portion of the stand. An inner support tube 2 (also referred to in a more general sense as an inner support member which encompasses a support structure of any suitable shape) is slidably engagable in a telescoping manner with the interior of the outer telescoping tube 1. In certain embodiments, the inner support tube 2 is positioned on the bottom or lower portion of the stand. The inner support tube 2 has a large support pad 7 firmly attached to the lower end of the inner support tube 2 to support the motorcycle on either firm or soft ground. To maximize the available adjustment range, the inner support tube 2 may, in certain embodiments, include a hollow structure or interior to allow sufficient space for an extension spring 3 that can accommodate a longer range of motion without spring damage. In certain embodiments, the extension spring 3 is attached to the pivot head 8 on the upper end and to the support pad 7 on the lower end and is capable of extending beyond the length of the outer telescoping tube 1 and/or the inner support tube 2.

Figure 8:
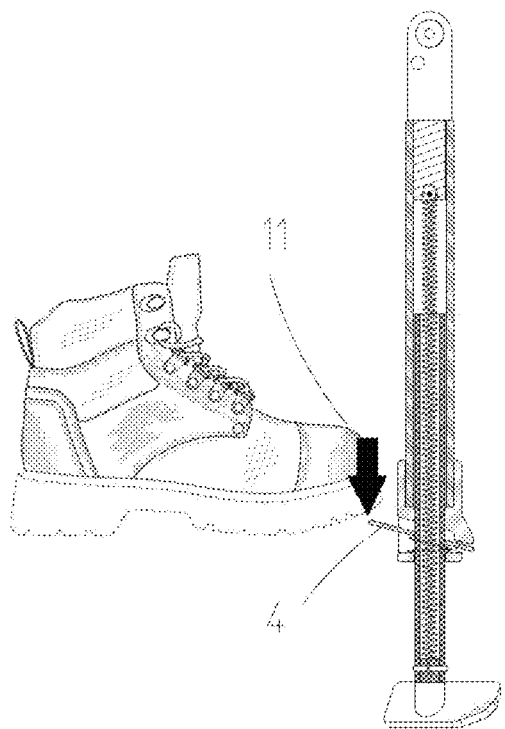
FIG. 8 illustrates the operation of an exemplary support stand according to the present disclosure.

In certain embodiments, the locking action of the telescoping mechanism may be accomplished by a tilted plate mechanism sometimes referred to as a "running clutch", a "clutch", a "clutch mechanism", a "clutch body" or a "clutch body housing". The clutch mechanism or clutch body 6 includes an outer housing that is firmly attached to the outer telescoping tube 1 by means of fasteners or adhesives typically used by those of skill in the art, a locking plate 4 and a locking plate engagement spring 5. In certain embodiments, the clutch body housing 6 includes an upper half and a lower half. The clutch body housing 6 may include a longitudinal aperture, a sidewall and a lateral surface positioned within the interior in the upper half of the clutch body housing 6 between sidewall to engage or seat the outer telescoping tube 1 while allowing longitudinal movement of the inner support tube 2 relative to the outer telescoping tube 1. The clutch body housing 6 may also include a lateral aperture positioned within the lower half of the housing of the clutch body housing 6. The lateral aperture may be utilized to house the locking plate 4 and the locking plate engagement spring 5. The clutch body housing 6 may also include a bottom lateral surface which seats the locking plate 4 and the engagement spring 5. The locking plate 4 may include an aperture which engages the inner support tube 2 within the clutch body housing 6. The tilted plate spring 5 may be housed within the lateral aperture of the clutch body housing 6 under the locking plate 4 to keep the locking plate 4 in the tilted position, thus causing sides of the aperture through the center of the tilted plate 4 to bind against the inner support tube 2. Thus, the tilted plate spring 5 is positioned below the tilted plate 4 and against the lower inside surface of the clutch body 6 to nominally position the plate 4 in the locked position. The clutch mechanism may be released by pressing axially onto a tab or end extending from the tilted plate 4 as shown in FIG. 8. When locked, the plate 4 will bind against the inner support tube 2 and transmit the supported weight against the lower end of the tilted plate 4 into the clutch body 6, which in turn transmits the supported weight into the pivot head 8 and through the pivot bolt 12 into the motorcycle frame. As the load on the support stand increases, the supported weight being placed on the lower end of the tilted plates causes it to bind proportionally harder against the inner support tube 2, thus increasing the resistance to movement. Suitable materials of sufficient strength and durability are used for the locking plate 4 and inner support tube 2 to prevent the inner support tube 2 from slipping under heavy load and to provide proper locking action. In certain embodiments, the tilted plate 4 is constructed of a durable material such as tempered or stainless steel, while the inner support tube 2 is manufactured from a softer metal, such as mild steel or aluminum. In other embodiments, aluminum may be used to manufacture these components in view of weight considerations of off highway vehicles. The tilted plate clutch has been found to be very durable and functional in the harsh conditions experienced by off highway vehicles.

In summary, FIGS. 5-6 illustrate the following: the upper head 8 is used to pivotally attach the support mechanism to the vehicle; the outer telescoping tube 1 longitudinally contains the inner support tube 2; the support foot 7 is attached to the lower end of the inner support tube 2; the retraction spring 3 is attached to the upper head at point 16 and the foot at point 17; the tilted locking plate 4 is contained within the locking mechanism or clutch body housing 6; the clutch body housing 6 is attached to the outer telescoping tube 1; and the locking plate 4 is nominally held in the locking position by use of a spread coil spring 5.

Because the motorcycle stand must be deployed in a manner that faces forward and outward from the vehicle, the support pad 7 is typically placed at specific angle to allow the bottom surface of the support pad 7 to be approximately parallel to the parking surface. To maintain the proper orientation of the support pad 7, a mechanism is present to prevent rotation of the inner and outer tubes with respect to each other. To those experienced in the art, this can be accomplished by a number of different mechanical features such as a pin and slot arrangement or the use of square or ovoid tubing. To prevent rotation as well as to improve resistance of the telescoping mechanisms to binding caused by damage or contamination with dirt and water, bushings 13 positioned between the outer telescoping tube 1 and the inner support tube 2 within the interior of the outer telescoping tube 1 as illustrated in FIG. 7. The bushings 13 may engage the inner support tube 2 through holes placed near the top portion of the inner support tube 2. A round boss or raised structure on the inner surface of the bushing may be used to engage the holes on the inner support tube 2. In certain embodiments, the bushings 13 may further engage the inner surface of a square or rectangular interior of the outer telescoping tube 1 with outer surfaces that have sufficient clearance to allow easy sliding while disallowing significant rotation of the inner support tube 2.

In summary FIG. 7 illustrates that the bushings mounted to the upper end of the inner tube 2 used to limit the maximum extension by contact with the locking mechanism body 6 and used to eliminate rotation between the inner support tube 2 and outer tube 1 by placement into holes 21 in the inner tube and mating to the inner flat surfaces of the outer tube 1.

Figure 9:
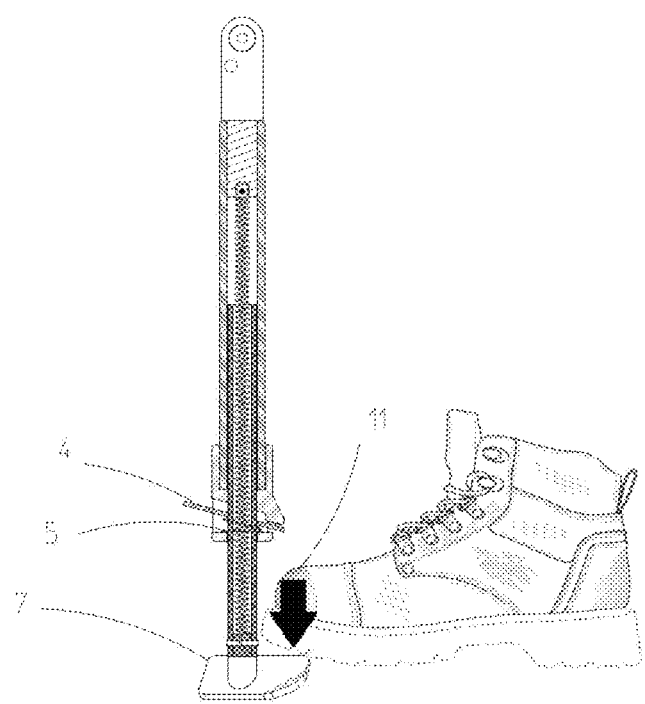
FIG. 9 illustrates the operation of an exemplary support stand according to the present disclosure.

Operation of the described embodiment easily and quickly allows increased accommodation to the uneven terrain that motorcycles must often be parked on. The operator can use just one foot or hand to quickly adjust the length over a range of approximately 150 cm (6 inches) on a typical application. FIG. 8 shows how an operator could use one foot to pressing downward on the release tab 4. This will cause the extension spring 3 to quickly pull the telescoping mechanism to the shortest length. FIG. 9 illustrates how pushing downward on the support pad 7 causes the stand to extend to the desired length with almost infinite incremental positioning ability and automatically locking into position.

In summary FIG. 8 shows the method used to retract the support structure to the minimum length. The operators foot 11 presses downward on the tilted locking plate 4 to release the locking mechanism and allow the retraction spring 3 to pull the telescoping assembly to the minimum length.

In summary FIG. 9 shows the method used to extend the support structure to the desired length. The operators foot 11 is used to push downward on the support pad 7 until the support structure is extended to the desired length.

Numerous embodiments have been described herein. It will be apparent to those skilled in the art that the disclosure provided above may incorporate changes and modifications without departing from the general scope of this invention. It is intended to include all such modifications and alterations in so far as they come within the scope of the appended claims or the equivalents thereof. The phrase "associated with" as used in this document, refers to structures which support the disclosed system and method and may also refer to structures not disclosed herein capable of supporting the disclosed system and method. Further, the "invention" as that term is used in this document is what is claimed in the claims of this document. The right to claim elements and/or sub-combinations that are disclosed herein as other inventions in other patent documents is hereby unconditionally reserved.

What is claimed is:

1. A support stand for holding a parked vehicle in an upright position comprising:
    an outer telescoping member having an inner surface and a hollow interior attached to a vehicle frame via a pivot point and a fastener which allows for angular movement of the support stand with respect to the vehicle along the pivot point, wherein the outer telescoping member includes a top portion and a bottom portion;
    an inner support member having a hollow interior which extensibly fits in a telescoping manner within the interior of the outer telescoping member, wherein the inner support member includes a top portion and a bottom portion, wherein the outer telescoping member is positioned at a top portion of the support stand, the inner support member is positioned at a bottom portion of the support stand and the inner support member is longitudinally extendable and retractable relative to the outer telescoping member when the support stand is in a downward position, wherein the inner support member contains bushings at its top portion to limit the travel of the inner support member relative to the outer telescoping member, to prevent rotation of the inner support member relative to the outer telescoping member and to provide sliding support against the outer telescoping member's inner surface;
    a ratcheting mechanism positioned within an interior of a clutch body housing for locking the inner support member with respect to the outer telescoping member, wherein the ratcheting mechanism is lockable in any position along a length of travel between the outer telescoping member and the inner support member with the support stand positioned in any angular position with respect to the vehicle and wherein the clutch body housing engages the outer telescoping member and the inner support member;
    an extension spring that is fit within the hollow interior of the outer telescoping member and the hollow interior of the inner support member, wherein the extension spring includes an upper end which is attached at a point at the top portion of the outer telescoping member and a lower end attached at a point at the bottom portion of the lower telescoping assembly and
    wherein the extension spring allows the inner support member to extend and retract relative to the outer telescoping member.

2. The support stand of claim 1, wherein a support foot is attached to a bottom surface of the inner support member.

3. The support stand of claim 2, wherein the clutch body housing comprises a longitudinal aperture formed by a side wall of the housing, a first lateral surface positioned within a portion of the interior of the clutch body housing to engage or seat the outer telescoping member while allowing longitudinal movement of the inner support tube relative to the outer telescoping tube, wherein the longitudinal aperture passes through the first lateral surface.

4. The support stand of claim 3, wherein the clutch body housing comprises at least one tilted locking plate and a locking plate engagement spring both of which are seated at a second bottom surface under the first lateral surface of the clutch body housing and wherein the locking plate engagement spring is positioned under the tilted locking plate.

5. The support stand of claim 4, wherein the clutch body housing further comprises a second lateral aperture which houses the tilted locking plate.

6. The support stand of claim 5, wherein the tilted locking plate includes an aperture through which the inner support member longitudinally passes when the support stand is in a downward position relative to the vehicle.

7. The support stand of claim 6, wherein the tilted locking plate has an extension arm which is externally accessible to an operator from the clutch body housing, wherein the extension on the locking plate, when moved into a first position along an axis transverse to the outer telescoping member and the inner support member, unlocks the ratcheting mechanism and when moved into a second position along an axis transverse to the outer telescoping member and the inner support member, locks the ratcheting mechanism.

8. The support stand of claim 7, wherein the inner support member is longitudinally extended in any orientation of varying length with respect to the outer support member by pulling the inner support member outward with respect to the outer telescoping member and wherein the inner support member is longitudinally retracted in any orientation of varying length with respect to the outer support member by axially moving the extension arm of the tilted locking plate in the first position to retract the support stand.

9. The support stand of claim 8, wherein the extension spring biases the inner support member to a position of full retraction.

10. The support stand of claim 9, wherein the support foot is pressed downward to extend the inner support member to a desired length outward when the locking plate is in the first position.

11. The support stand of claim 7, wherein the ratcheting mechanism does not rely on finite and fixed adjustment points to lock the outer telescoping member and the inner support member in various positions with respect to each other.

12. The support stand of claim 11, wherein the tilted locking plate grips the inner support member without the need for stopping points present on either of the outer telescoping member or the inner support member to engage the tilted locking plate.

13. The support stand of claim 8, wherein a load applied to the support stand causes a corresponding force to be applied to the tilted plate which in turn causes the tilted plate to bind with greater force against the inner support member.

14. The support stand of claim 13, wherein the tilted locking plate is manufactured from one of the following materials: tempered steel and stainless steel.

15. The support stand of claim 1, wherein the bushings engage the inner support member through a boss which engages apertures present at the top portion of the inner support member.

16. The support stand of claim 15, wherein the bushings have an outer surface which engages the interior of the outer telescoping member while providing sufficient clearance to allow for slidable engagement with the inner support member.

17. The support stand of claim 1, wherein the outer telescoping member engages a pivot head which is pivotally engaged to the frame on the vehicle.

18. The support stand of claim 17, wherein a spring is mounted in an over-center position between the support stand and the vehicle frame to allow for axial rotation of the support stand relative to the vehicle frame.

\* \* \* \* \*